United States Patent [19]

Metcalfe

[11] Patent Number: 4,699,479
[45] Date of Patent: Oct. 13, 1987

[54] EYEGLASS FRAME STRUCTURE AND METHOD OF ASSEMBLING SAME

[75] Inventor: Richard T. Metcalfe, Sturbridge, Mass.

[73] Assignee: American Optical Corporation, Southbridge, Mass.

[21] Appl. No.: 747,059

[22] Filed: Jun. 20, 1985

[51] Int. Cl.4 .......................... G02C 5/14; G02C 5/22
[52] U.S. Cl. ..................................... 351/153; 351/121; 16/228
[58] Field of Search ....................... 351/153, 121, 111; 16/228

[56] References Cited

U.S. PATENT DOCUMENTS 3,156,756 11/1964 Seaver .................................. 351/153
4,561,735 12/1985 Levoy .................................. 351/153

Primary Examiner—Rodney B. Bovernick
Attorney, Agent, or Firm—Pahl, Lorusso & Loud

[57] ABSTRACT

Disclosed is an eyeglass frame and method of assembling the same in which a temple includes a pair of parallel ears which extend from one end of the temple. Each ear includes a pin receiving hole, and on the facing surfaces of the ears, a ramped slot extends from the hole to one of the side surfaces. The depth of the slot increases as it approaches the side surface. The lens supporting structure includes a single extension member with a pin supporting hole. The pin is inserted into this hole, and the lens supporting structure and temple are brought together so that the two ends of the pin are aligned with the two slots on the temple. As the temple and the lens supporting structure are urged toward one another, the ears of the temple are forced apart by the ends of the pin until the pin reaches the pin receiving hole at which point the ends fall into the hole.

12 Claims, 3 Drawing Figures

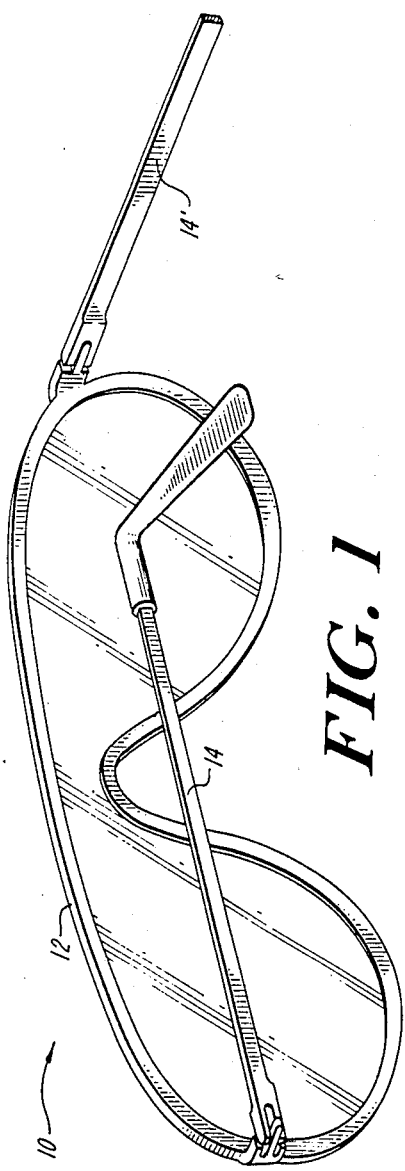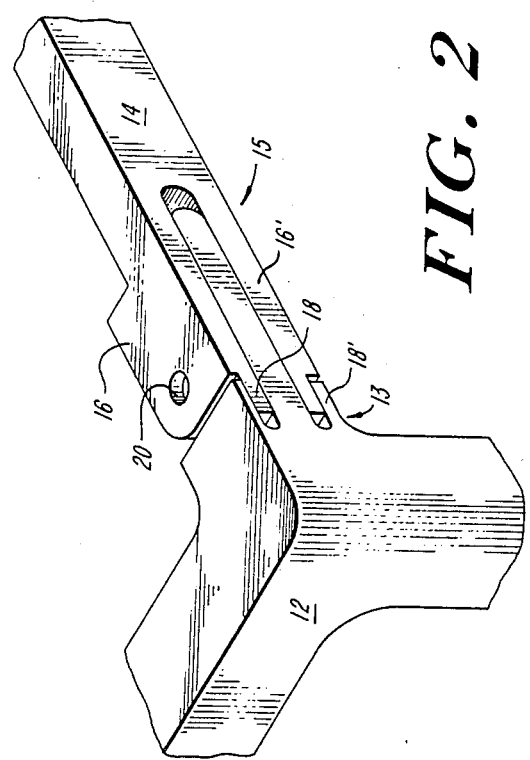

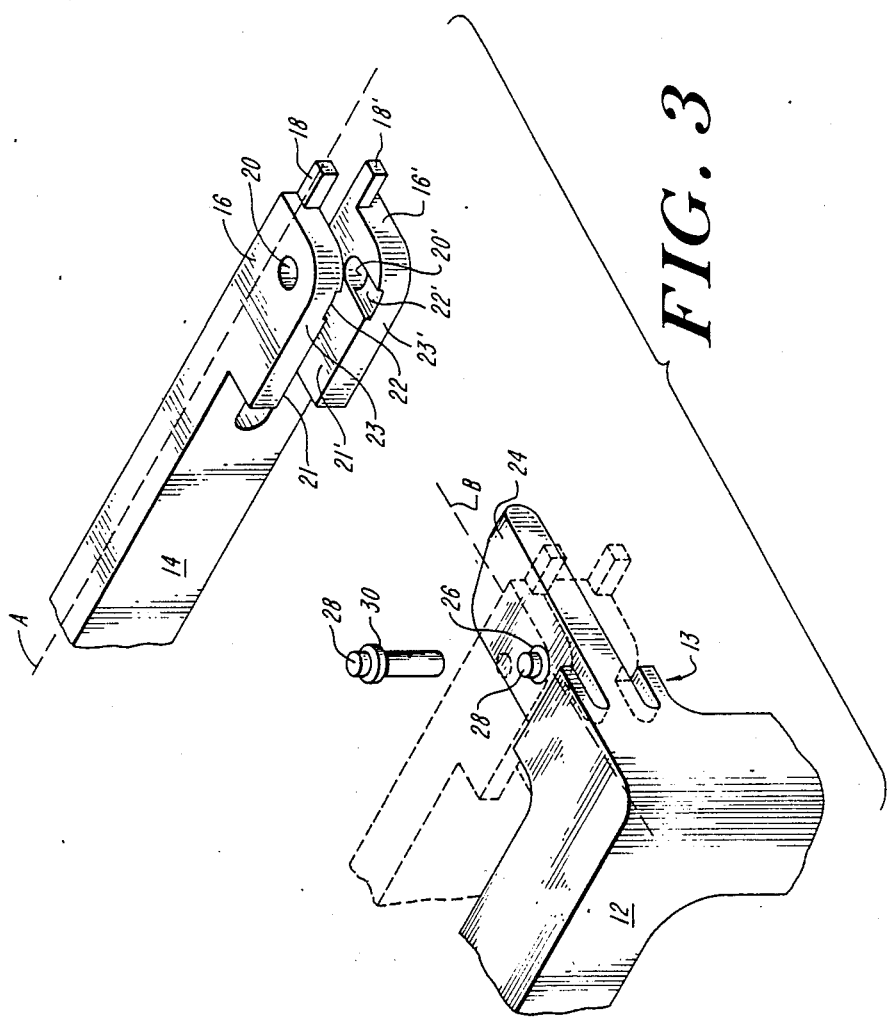

EYEGLASS FRAME STRUCTURE AND METHOD OF ASSEMBLING SAME

BACKGROUND OF THE INVENTION

This invention relates in general to eyeglass frames, and more particularly to eyeglass frames which are easily and quickly assembled.

The majority of eyeglass frames manufactured today include a lens supporting structure to which two temples are pivotably attached by means of a hinge assembly. The hinges can be metal or plastic, and a pin secures the hinge member of the lens support to the hinge member of the temple. The hinge members are glued, screwed or fastened by some other means to the lens support and temple. Assembly of such frames utilizing metal or plastic hinges with a screw or pin assembly requires a number of manufacturing steps which complicate the assembly process.

Eyeglass frames are also manufactured using other known pivoting connecting assemblies which provide free movement of the temples from the lens supporting structure. The basic requirement for any pivoting connector assembly is that the temple movement be made easily, and the pivoting assembly be strong and reliable. The principal problem with all known assemblies, as in the case of the hinge assemblies described above, is that the assemblies are rather complex. This complexity results in added hardware costs as well as added assembly costs. In addition, some of these assemblies provide inadequate strength and reliability.

It is therefore a principal object of the present invention to provide an eyeglass frame which is easily and quickly assembled.

Another object of the present invention is to provide an eyeglass frame in which otherwise securely connected temples can be disassembled from a lens supporting structure.

A further object of the present invention is to provide an eyeglass frame, the components of which can be inexpensively manufactured.

Still another object of the present invention is to provide an eyeglass frame which is strong and reliable.

SUMMARY OF THE INVENTION

The eyeglass frame structure of the present invention comprises a lens supporting structure to which at least one temple is pivotably attached. Each temple includes a pair of parallel ears which extend from one end of the temple. Each ear includes a pin receiving hole. On the facing surfaces of the ears, a ramped slot extends from the hole to one of the side surfaces. The depth of the slot increases as it approaches the side surface.

The lens supporting structure includes a single extension member with a pin supporting hole. The pin is inserted into this hole, and the lens supporting structure and the temple are brought together so that the two ends of the pin are aligned with the two slots on the temple. As the temple and the lens supporting structure are urged toward one another, the ears of the temple are forced apart by the ends of the pin until the pin reaches the pin receiving hole at which time the ends of the pin fall into the hole.

These and other features and objects of the present invention will be more clearly understood from the following detailed description of the preferred embodiments which should be read in light of the accompanying drawings, in which corresponding reference numerals refer to corresponding parts throughout the several views.

BRIEF DESCRIPTION OF THE DRAWINGS

FIG. 1 is a perspective view of an eyeglass frame according to the present invention in which the temples are attached to the lens supporting through the unique hinge assembly of the present invention;

FIG. 2 is a perspective view of a hinge assembly of the eyeglass frame of the present invention;

FIG. 3 is an exploded perspective view of the hinge assembly of the eyeglass frame of the present invention with the dotted portion showing the temple attached to the lens supporting structure.

DETAILED DESCRIPTION OF THE PREFERRED EMBODIMENTS

In accordance with the present invention, the eyeglass frame 10 shown in FIG. 1 includes a lens supporting structure 12 and two temples 14, 14'. Temple connecting members 13, 13', integrally attached to lens supporting structure 12, extend in a generally perpendicular direction from each end of the lens supporting structure 12, and a temple 14, 14' is pivotably connected to each of the temple connecting members 13, 13'. The temples 14, 14' pivot between an open position which enables a user to wear the eyeglasses and support the temples with his ears, and a closed position which allows the eyeglasses to be stored. In FIG. 1, temple 14 is in a closed position, and temple 14' is in an open position.

The frame hinge assembly of the present invention shown most clearly in FIGS. 2 and 3 enables a temple 14 to be easily and quickly secured to the lens supporting structure 12. The end of temple 14, which in an assembled frame is interconnected with temple connecting member 13, includes two ears 16, 16' extending from temple end 15. Extending from each ear 16, 16' is a small tab member 18, 18' respectively. Each ear portion 16, 16' also includes a small circular hole 20, 20', respectively, and holes 20, 20' are aligned so that they are positioned one directly above the other. From each hole 20, 20', ramped slots 22, 22' extend on facing surfaces 21, 21' toward side surfaces 23, 23' of ears 16, 16'. When the eyeglasses are worn these side surfaces 23, 23' will be adjacent the wearer's temples. The depth of slots 22, 22' increases as the slots approach the side surface 23, 23' of ears 16, 16'. In other words, the ramped slots 22, 22' have a greater depth relative to facing surfaces 21, 21' , at location along side surface 23, 23' than at a location adjacent holes 23, 23'.

Each temple connecting member 13 of the lens supporting structure 12 includes one extension member 24 having a thickness slightly less than the distance between facing surfaces 21, 21' of the ears 16, 16' of the temple 14. A small circular hole 26 extends through extension member 24, and a shoulder pin 28 with flange 30 is inserted in the hole. The hole 26 has two different interior diameters so as to form a ridge to mate with flange 30. The flange 30, which may be integral with pin 28, prevents the pin from being in a non-centered location within the lens supporting structure extension member 24. Extension member 13 also includes two slots 32, 32' for receiving tabs 18, 18' when the temple 14 is in an open position.

To assemble the frame by connecting the temple 14 to the lens supporting structure 12, the temple 14 is placed so that the longitudinal axis A of the temple 14 is at a right angle relative to the longitudinal axis B of lens supporting structure extension member 13 as shown in FIG. 3. When the temple 14 and lens supporting structure are positioned in this manner, the entry ends of ramped slots 22, 22' are facing extension member 24. The ends of pin 28 are aligned with the ramped slots 22, 22' and then the temple 14 is urged towards the lens supporting structure 12. The force of this urging spreads ears 16, 16' of the temple until the pin 28 reaches holes 20, 20' at which point the pin falls into the holes. Once pin 28 is positioned within holes 20, 20', temple 14 can be rotated 90° to the open, wearing position. In such an open position, tabs 18, 18' mate with slots 32, 32' in the connecting member 13 to limit rotation of temples 14, 14'. In this position, the temple ears 16, 16' are locked with the temple connecting member 13, and the temple can not be separated from the lens supporting structure.

In order to remove the temple from the lens supporting structure, the temples must be folded 90° to the above-defined assembly position. The temple 14 is then rotated about its longitudinal axis A to spread the ears 16, 16' slightly and thereby disengage the pin from the holes 20, 20'. The temple 14 is then separated from the lens supporting structure 12 with the pin 28 sliding down ramps 22, 22'.

The temple hinge construction of the present invention provides a number of advantages over known temple hinge constructions. In particular, the parts can be molded and do not require more expensive and/or more complicated metal hinges. In addition, once the temple is open to a wearing position, the temple 14 is locked together with the lens supporting structure 12, and cannot be disengaged. Finally, disassembly is also easily achieved when desired, and assembly and disassembly do not require the use of tools.

While the invention has been described with reference to its preferred embodiment, it is understood that various modifications and alterations will occur to those skilled in the art from the foregoing description and the drawings. In particular, it is understood that the eyeglass frame of the present invention can be produced so that the arrangement is reversed, i.e. the ears 16, 16' are part of the lens supporting structure 12 and the extension member 24 is part of the temple 14. These and all other such modifications and variations which will occur to those skilled in the art are intended to fall within the scope of the appended claims.

What is claimed is:

1. An eyeglass frame which is easily and quickly assembled and disassembled comprising:
    at least one temple having a pair of extension members projecting from one end of said at least one temple and separated from each other by a first distance and a pair of rotation limiting tabs, one of said tabs integrally extending from each of said temple extension members in a direction parallel to a central longitudinal axis of said temple, said extension members including pin receiving holes positioned parallel to each other and ramped slots on facing surfaces, said slots extending from said pin receiving holes toward an edge of said extension members, the depth of said slots increasing in a direction away from said pin receiving holes;
    lens supporting structure including at least one temple abutting member including a means for receiving said tabs and including a single projection, the thickness of said single projection being less than said first distance, said single projection including a means for supporting a pin so that ends of said pin may extend from upper and lower surfaces of said single projection,
    a pin inserted in said pin supporting means and having a length greater than the distance between said upper and lower surfaces of said single projection;
    whereby, said at least one temple is assembled to said lens supporting structure by inserting said single projection of said lens supporting structure between said extension members of said at least one temple with said pin aligned with said ramped slots and applying a force to bring said lens supporting structure and said temple together.

2. The eyeglass frame of claim 1 wherein said lens supporting structure includes receiving member slots for said rotation limiting tabs, one of each of said slots positioned to correspond to one of said rotation limiting tabs of said temple.

3. The eyeglass frame of claim 1 wherein said pin includes a shoulder surrounding said pin and said pin supporting means includes a shoulder mating ridge for preventing vertical movement of said pin.

4. The eyeglass frame of claim 1 wherein said temple is fabricated from a polymer.

5. The eyeglass frame of claim 1 wherein said lens supporting structure is fabricated from a polymer.

6. The eyeglass frame of claim 1 wherein said temple is fabricated from a metal.

7. The eyeglass frame of claim 1 wherein said lens supporting structures fabricated from a metal.

8. A method of assembling an eyeglass frame including at least one temple and a lens supporting structure to which the temples are pivotally connected, comprising the steps of:
    providing a pair of extension members projecting from one end of each of said at least one temple and separated from each other by a first distance and a pair of rotation limiting tabs with each of said tabs integrally extending from one of said temple extension members in a direction parallel to a central longitudinal axis of said temple, each of said extension members including a pin receiving hole positioned to be in alignment with one another and ramped slots on facing surfaces, said slots extending from said pin receiving holes toward an edge of said extension members, the depth of said slots increasing in a direction away from said pin receiving holes;
    providing a lens supporting structure including at least one temple abutting member having a means for receiving said tabs and having a single projection, the thickness of said single projection being less than said first distance, said single projection including a means for supporting a pin so that ends of said pin extend from upper and lower surfaces of said first extension;
    providing a pin having a length greater than said first distance;
    placing said pin in said pin supporting means of said lens supporting structure;
    positioning said at least one temple so that a longitudinal axis of said temple is at an angle of approximately 90 degrees relative to the longitudinal axis of said single projection of one of said at least one temple abutting member, ends of said pin extending from said single projection of said temple abutting member being aligned with said slots of said temple extension member;

urging said lens supporting structure into said temple so that said pin is forced through said ramped slots thereby forcing said pair of temple extension members away from each other until said pin is captured by said pin receiving holes.

9. A hinge assembly for pivotably connecting two members of an eyeglass frame, said hinge assembly comprising:

a female member having a pair of extension members projecting from one end of said female member and separated from each other by a first distance and a pair of rotation limiting tabs, one of said tabs integrally extending from each of said extension members in a direction parallel to a central longitudinal axis of said extension members, said extension members including pin receiving holes positioned parallel to each other and ramped slots on facing surfaces, said slots extending from said pin receiving holes toward an edge of said extension members, the depth of said slots increasing in a direction away from said pin receiving holes;

a male member including a means for receiving said tabs and a single projection, the thickness of said single projection including a means for supporting a pin so that ends of said pin may extend from upper and lower surfaces of said single projection;

a pin inserted in said pin supporting means and having a length greater than the distance between said upper and lower surfaces of said single projection;

whereby said female member is assembled to said male member by inserting said single projection of said male member between said extension members of said female member with said pin, captured by said pin supporting means, aligned with said ramped slots and applying a force to bring said male and female members together.

10. The hinge assembly of claim 9 wherein said means for receiving said tabs comprises a pair of slots, one of each of said slots positioned and dimensioned to correspond to one of said rotation limiting tabs of said female member.

11. The hinge assembly of claim 9 wherein said pin includes a shoulder surrounding said pin and said pin supporting means includes a shoulder mating ridge for preventing vertical movement of said pin.

12. The hinge assembly of claim 9 wherein said extension members are fabricated from a material that enables said extension members to be forced apart as said pin is urged through said slots until said pin is captured by said pin receiving holes.

* * * * *